(12) United States Patent
Waltner et al.

(10) Patent No.: US 10,262,545 B2
(45) Date of Patent: Apr. 16, 2019

(54) OPTIMAL FLIGHT PLANNER

(71) Applicant: Sikorsky Aircraft Corporation, Stratford, CT (US)

(72) Inventors: Peter James Waltner, Royal Palm Beach, FL (US); John R. Herter, Stuart, FL (US); Per Lars R. Stubbendorff, Jupiter, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/485,951

(22) Filed: Apr. 12, 2017

(65) Prior Publication Data
US 2018/0301040 A1    Oct. 18, 2018

Related U.S. Application Data

(60) Provisional application No. 62/323,977, filed on Apr. 18, 2016.

(51) Int. Cl.
*G08G 5/00* (2006.01)
*G06Q 10/00* (2012.01)
*G06Q 10/06* (2012.01)

(52) U.S. Cl.
CPC ..... *G08G 5/0034* (2013.01); *G06Q 10/06315* (2013.01)

(58) Field of Classification Search
CPC .......... G08G 5/00; G08G 5/0034; G08G 1/16; G06Q 10/00; G06Q 10/0631; G06Q 10/06315; G01C 21/26; G01C 21/34; G01C 21/3484
See application file for complete search history.

(56) References Cited

U.S. PATENT DOCUMENTS

| | | | |
|---|---|---|---|
| 7,577,108 B2 * | 8/2009 | Zhang | H04L 45/08 370/228 |
| 8,478,642 B2 * | 7/2013 | Dey | G01C 21/3484 705/14.4 |
| 9,156,567 B2 | 10/2015 | Covington et al. | |
| 2003/0093219 A1 | 5/2003 | Schultz et al. | |
| 2013/0179067 A1 * | 7/2013 | Trowbridge | G01C 21/3484 701/410 |
| 2013/0297089 A1 * | 11/2013 | Fu | G06F 1/26 700/295 |
| 2013/0304439 A1 * | 11/2013 | Van der Velden | G06F 17/5009 703/6 |
| 2013/0332059 A1 * | 12/2013 | del Pozo de Poza | G06Q 10/047 701/123 |
| 2015/0274314 A1 | 10/2015 | Conrad | |

* cited by examiner

*Primary Examiner* — Yonel Beaulieu
(74) *Attorney, Agent, or Firm* — Cantor Colburn LLP

(57) ABSTRACT

A system for a vehicle includes a receiver configured to receive input data, and a processor configured to run an optimization algorithm to evaluate the input data. The optimization algorithm includes at least one cost model configured to determine vehicle operational parameters to meet the input data. An output module is configured to output to the vehicle operational parameters that optimize operation of the vehicle in view of the input data.

19 Claims, 5 Drawing Sheets

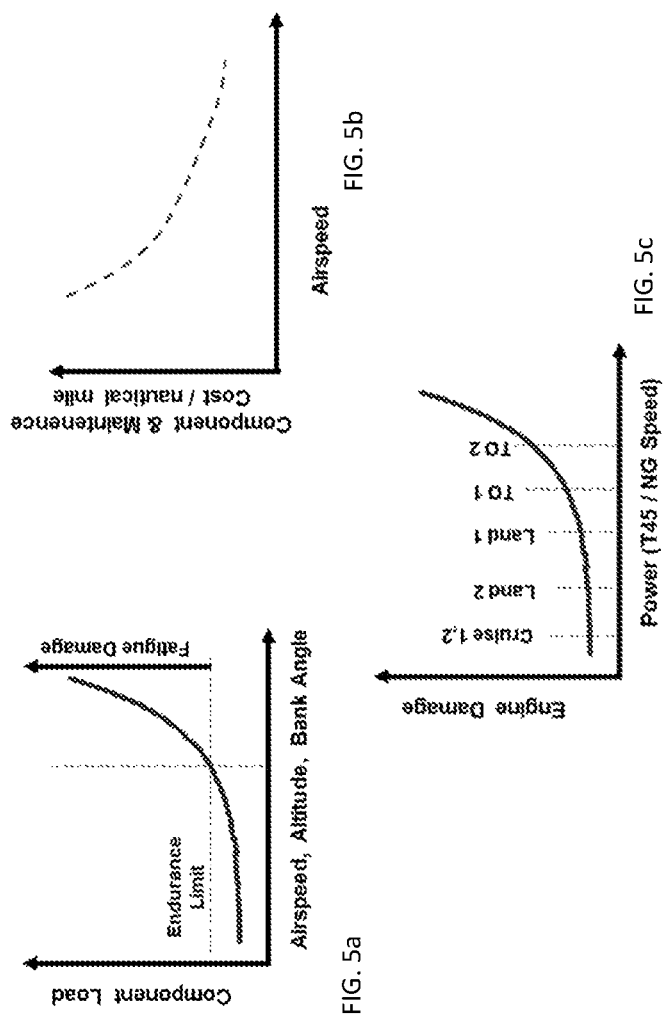

OPTIMAL FLIGHT PLANNER

CROSS REFERENCE TO RELATED APPLICATIONS

This application claims the benefit of U.S. Provisional Application No. 62/323,977, filed Apr. 18, 2016, the contents of which are incorporated by reference in its entirety herein.

BACKGROUND

The subject matter disclosed herein generally relates to an aircraft control system, and more particularly, to economic optimization of the aircraft.

Operators of both fixed wing and rotary wing aircraft are under pressure to operate the aircraft as efficiently as possible due to the narrow margins of the particular business. Substantial expenses typically include fuel costs, maintenance costs, part replacement cost, and the cost associated with aircraft downtime, for example.

With regard to fuel usage, operators typically perform a basic analysis of their flight operations in an attempt to reduce fuel consumption. Further, maintenance costs, part replacement costs, and downtime costs have typically been evaluated by analyzing historical operational data. However, such practices are not only time consuming, but also generate only an approximation of the operational cost associated with various flight parameters.

There is therefore, a need for improved systems and methods for evaluating and optimizing the economic usage of an aircraft for pre-flight planning and in real time during flight.

BRIEF DESCRIPTION

According to one embodiment, a system for a vehicle includes a receiver configured to receive input data, and a processor configured to run an optimization algorithm to evaluate the input data. The optimization algorithm includes at least one cost model configured to determine vehicle operational parameters to meet the input data. An output module is configured to output to the vehicle operational parameters that optimize operation of the vehicle in view of the input data.

In addition to one or more of the features described above, or as an alternative, in further embodiments the input data includes at least one of a selected flight strategy, aircraft sensor data, user constraints, and a proposed mission plan.

In addition to one or more of the features described above, or as an alternative, in further embodiments the vehicle operational parameters include a flight plan having a plurality of optimized parameters associated therewith.

In addition to one or more of the features described above, or as an alternative, in further embodiments the vehicle operational parameters include a plurality of various mission strategies, each having one or more distinct operating parameters, and a cost or revenue associated with each strategy.

In addition to one or more of the features described above, or as an alternative, in further embodiments the at least one cost model includes a usage based lifting cost model configured to evaluate damage to one or more components of the vehicle during operation.

In addition to one or more of the features described above, or as an alternative, in further embodiments the at least one cost model includes an environmental cost model configured to evaluate at least one of pollution and emissions generated during operation of the vehicle.

In addition to one or more of the features described above, or as an alternative, in further embodiments the at least one cost model includes an financial cost and revenue model configured to evaluate a cost of operating the vehicle in view of a primary mode of operation of the vehicle.

In addition to one or more of the features described above, or as an alternative, in further embodiments the at least one cost model includes an operator cost model configured to evaluate the cost to an operator based on the data input to the optimization algorithm.

In addition to one or more of the features described above, or as an alternative, in further embodiments the optimization algorithm includes a plurality of cost models and further includes a weight matrix configured to assign a priority to each values generated by the plurality of cost models.

In addition to one or more of the features described above, or as an alternative, in further embodiments the weight matrix is configured to convert each value output from the plurality of cost models into a homogenous unit.

In addition to one or more of the features described above, or as an alternative, in further embodiments the one or more operational parameters are output by the optimization algorithm in real time.

In addition to one or more of the features described above, or as an alternative, in further embodiments the operational parameters output to the vehicle are configured to optimize a profit of the vehicle during operation.

In addition to one or more of the features described above, or as an alternative, in further embodiments the vehicle is an aircraft.

According to another embodiment, a method of optimizing economic operation of a vehicle includes providing a receiver for receiving input data and supplying the input data to a usage optimization algorithm. The input data is processing in the optimization algorithm. The optimization algorithm includes at least one cost model configured to determine vehicle operation parameters to meet the input data. At least one vehicle operational parameter is output to the vehicle such that operation of the vehicle is optimized in view of the input data.

In addition to one or more of the features described above, or as an alternative, in further embodiments the input data is provided to the receiver by one or more sensors of the vehicle.

In addition to one or more of the features described above, or as an alternative, in further embodiments the operational parameters output to the vehicle are configured to optimize a profit of the vehicle during operation.

In addition to one or more of the features described above, or as an alternative, in further embodiments further comprising, changing at least one operational parameter of the vehicle in response to the output from the optimization algorithm.

In addition to one or more of the features described above, or as an alternative, in further embodiments when the vehicle is in autopilot, the optimization algorithm is configured to automatically provide at least one adjustable control reference to the vehicle such that a control system of the vehicle is coupled up to an optimal parameter.

In addition to one or more of the features described above, or as an alternative, in further embodiments the input data includes an operational restriction configured to restrict the accrual of additional damage to a component, the operational restriction being displayed to an operator of the vehicle.

In addition to one or more of the features described above, or as an alternative, in further embodiments the input data includes user constraints and the optimization algorithm associates a cost with each of user constraint.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIGS. 5a-5c are various graphs representing the relationship between a component load, damage and maintenance cost, relative to various parameters according to an embodiment.

The detailed description explains embodiments of the disclosure, together with advantages and features, by way of example with reference to the drawings.

DETAILED DESCRIPTION

Figure 1:
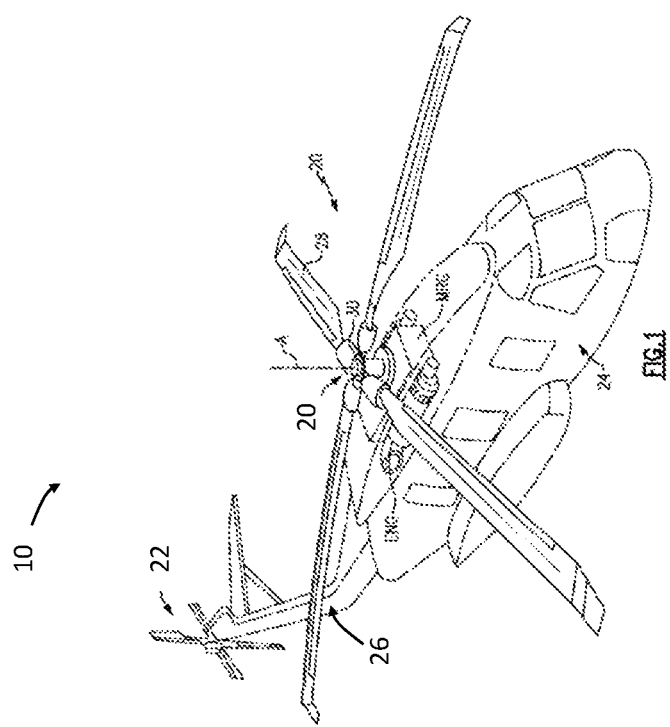
FIG. 1 is a perspective view of an example of a rotary wing aircraft.

FIG. 1 schematically illustrates an example of a vertical take-off and landing (VTOL) rotary wing aircraft 10. The aircraft includes a main rotor system 20 supported by an airframe 24 having an extending tail 26 which mounts an anti-torque system 22, such as a tail rotor system. While shown as an anti-torque system 22, it is understood the anti-torque system 22 can be a translational thrust system, a pusher propeller, a rotor propulsion system, and the like in addition to or instead of the shown anti-torque system. The main rotor system 20 includes a plurality of rotor blade assemblies 28 mounted to a rotor hub 30. The main rotor assembly 20 is driven about an axis of rotation A through a main gearbox (illustrated schematically at MRG) by one or more engines ENG. The main gearbox MRG may be interposed between the one or more engines ENG, the main rotor system 20, and the anti-torque system 22. The main gearbox MRG is mechanically connected to the main rotor system 20 and to the anti-torque system 22 so that the main rotor system 20 and the anti-torque system 22 may both be driven by the main rotor gearbox MRG. Although a particular helicopter configuration is illustrated and described in the disclosed embodiment, other configurations aircrafts and vehicles, such as high speed compound rotary wing aircrafts with supplemental translational thrust systems, dual contra-rotating, coaxial rotor system aircrafts, tilt-rotors and tilt-wing aircrafts, and fixed wing aircrafts, may also benefit from embodiments of the disclosure.

Figure 2:
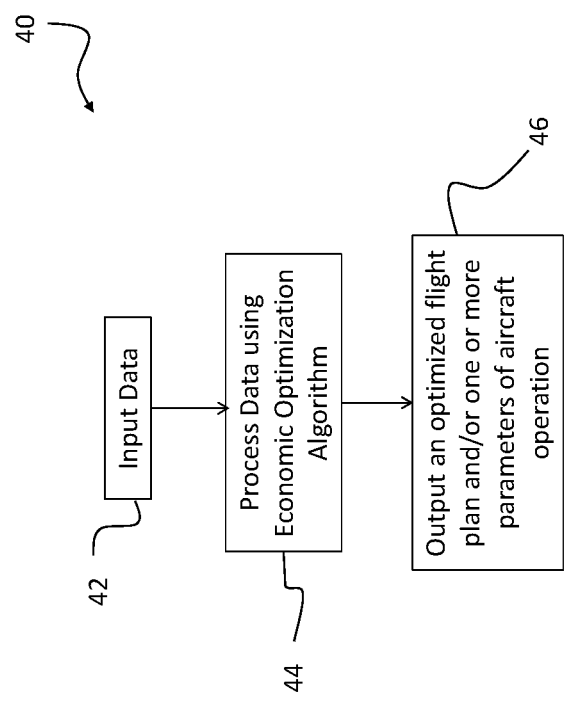
FIG. 2 is a flow chart illustrated a method of optimizing operation of a vehicle to maximize revenue and minimize cost during operation of the vehicle according to an embodiment.
Figure 3:
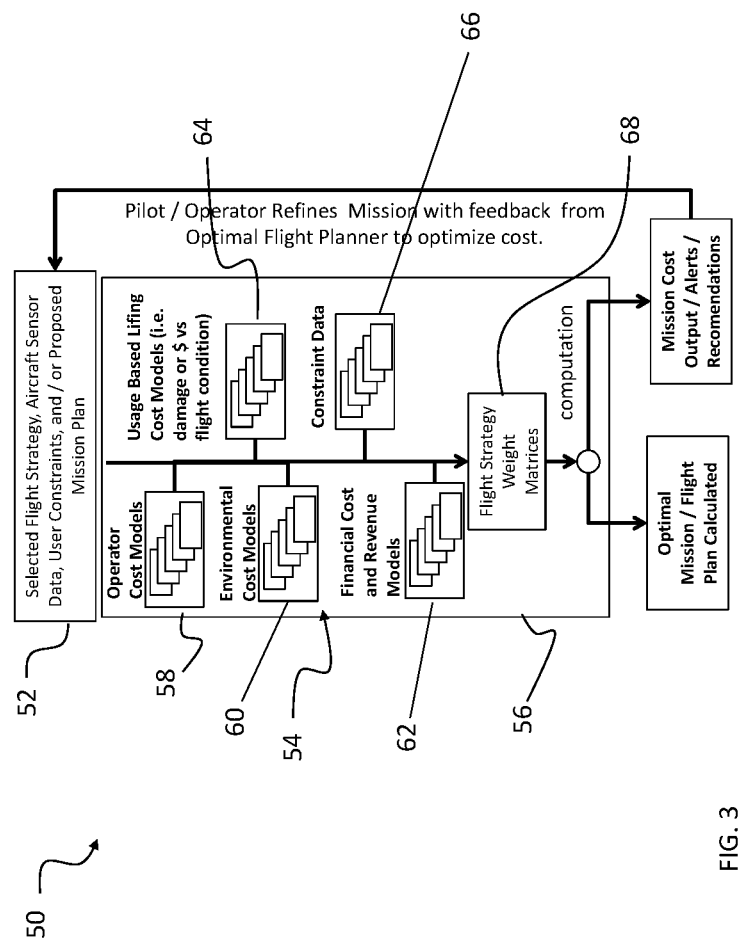
FIG. 3 is a schematic diagram of a control system of a vehicle having a processor including an optimization algorithm according to an embodiment.

With reference now to FIGS. 2 and 3, a method 40 for optimizing economic operation of a vehicle, such as aircraft 10 for example, to minimize cost and maximize revenue and net profit is illustrated. The method 40 includes inputting relevant data into an economic optimization algorithm, as shown in block 42. A processor (not shown) within the flight control system of the aircraft, such as within the Flight Control Computer (FCC) (not shown) for example, may be configured to run the optimization algorithm. After one or more inputs are provided thereto, such as via a receiver of the vehicle for example, the data is processed within the algorithm (block 44), and in block 46 an optimal flight plan or one or more recommended operational parameters intended to maximize the profit of the aircraft 10 during a proposed mission or flight regime are communicated to a pilot, operator, or remote controller.

Alternatively, the optimization algorithm may be arranged in communication with the flight control system such that at least one of the changes in operational parameters output by the optimization algorithm are automatically used as an input for fully coupled flight (autopilot) or during autonomous flight. Thus, when the flight control system operates in autopilot, the flight control system may use the one or more outputs from the optimization algorithm for reference and to command the aircraft 10 to maintain economic operation as ambient conditions and aircraft weight change throughout the flight. Conventional autopilot systems, couple the aircraft to fixed parameters, such as target altitude, speed, bank angle, and climb rate for example, provided by a pilot. By automatically providing operating parameters output from the optimization algorithm to the flight control system, the overall pilot workload is in autopilot is reduced, resulting in significant benefits compared to existing solutions.

The relevant data, illustrated as 52 in FIG. 3, may be input to the optimization algorithm (numeral 50 in FIG. 3) manually, such as by an operator or pilot of the aircraft, includes at least one of a selected flight strategy, aircraft sensor data, user constraints, and a proposed mission plan. Examples of the aircraft sensor data may include vehicle condition data, such as airspeed, altitude, air temperature, body orientation, body angular rates, body angular acceleration, body linear acceleration, load factor, and drive train information including torque, cycles, and revolutions per minute for example. In one embodiment, the aircraft sensor data is provided to the optimization algorithm by one or more sensors of the aircraft 10 arranged in communication directly or indirectly with the processor. Examples of user constraints include, but are not limited to aircraft state maximum and minimum values, geographical constraints, component damage accrual rate, as well as elective constraints, such as speed, bank angle, and altitude for example. Any type of user constraint is considered within the scope of the disclosure.

The optimization algorithm 50 is configured to access a plurality of stored models 54 for evaluating the input data 52. The stored models, such as cost models or constraint data for example, may be stored within at least one memory 56 accessible by the processor. The at least one memory may for example, be selected from a UVPROM, EEPROM, FLASH, RAM, ROM, DVD, CD, a hard drive, or other computer readable medium which stores the cost models described herein. The stored models 54 may be fixed, or alternatively, it may be desirable to update the stored models 54 over time. In such embodiments, the stored models 54 may be modified by the original equipment manufacturer or the operator, such as to reflect changes in business costs for example.

The stored models accessible by the processor are used to process and evaluate input data 52. In the illustrated, non-limiting embodiment, a first cost model accessible by the processor and illustrated schematically at 58, is an "Operator Cost Model." The Operator Cost Model 58 is configured to store information associated with costs related to operation of an aircraft 10. Examples of such costs include, but are not limited to, the cost for personnel both to operate and maintain the aircraft, the maintenance costs for repairing and replacing components of the aircraft, and the costs associated with downtime of the aircraft, such as during maintenance for example.

Another cost model accessible by the processor is an "Environment Cost Model," indicated by numeral 60. The Environmental Cost Model is configured to evaluate the environmental footprint of the aircraft 10 based on the mission and/or one or more operating parameters of the aircraft 10. For example, the Environmental Cost Model 60 can be used to estimate the nitrous oxide and carbon emissions, or the potential for noise pollution produced during operation of the aircraft. The Environmental Cost Model may further be able to evaluate a cost of any fines or credits associated with such emissions and pollution.

A Financial Cost and Revenue Model, indicated schematically at 62, may provide at least one of cost and revenue information based on a type of contract or primary purpose associated with operation of the aircraft. For example, embedded within the Financial Cost and Revenue Model 62 may be a table or graph identifying the cost and revenue of the aircraft 10 when the primary purpose of operation is to carry cargo of a certain weight. The Financial Cost and Revenue Model 62 may additionally include a separate table or graph evaluating the cost and revenue of the aircraft 10 when the primary purpose of operation is to move passengers from one location to another location. The primary purposes described herein are intended as examples only, and the costs associated with other types of operation of the aircraft 10 may similarly be included within the Financial Cost and Revenue Modes. In one embodiment, based on the type of operation of the aircraft 10, the Financial Cost and Revenue Models may provide a cost and/or revenue of the aircraft per hour, per mile, per tonne transported, per operation, or per a response time as defined by the type of operation.

Figure 4B:
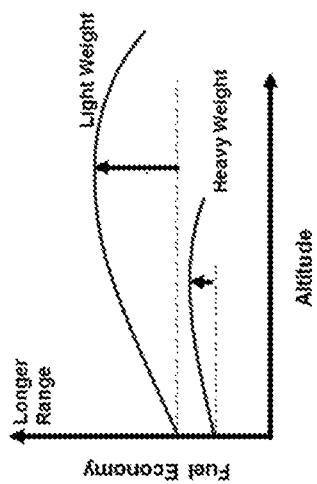
FIGS. 4a and 4b are various graphs representing the relationship between fuel economy and airspeed and altitude according to an embodiment.
Figure 4A:
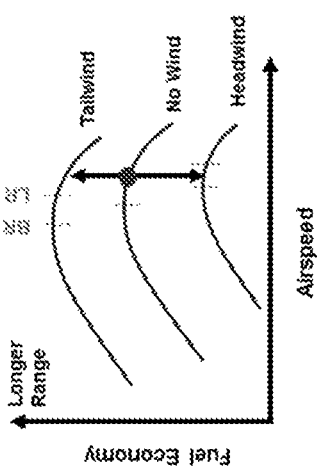

With reference to FIGS. 4a and 4h, examples of graphs embedded within the Financial Cost and Revenue Model and used to evaluate the input data 52 are illustrated in more detail. As shown, the fuel economy of the aircraft 10 is evaluated with respect to a plurality of factors. The graphs illustrate that the fuel economy of the aircraft is evaluated within the Financial Cost and Revenue Model not only based on the airspeed of the aircraft and the direction of wind relative to the aircraft, but also based on the altitude of the aircraft and a weight of the aircraft. Additionally, the fuel economy noted in FIGS. 4a and 4b may be altered by engagement of various power generating or power consuming systems. One such system is a Single Engine Operation (SEO) mode wherein an engine is shutdown inflight in order to increase fuel economy per nautical mile; however, engagement of such a system may incur a maintenance cost. Similarly, fuel may be saved by shutting down the engine and/or the rotor system while loading and unloading passengers, but again, there may be a maintenance cost associated with such action. Alternatively, or in addition, the fuel economy may be altered by balancing the power provided from one or more engine and an electrical power source of a hybrid rotorcraft. The onboard electrical power source may be selectively engaged to maximize the power output from an engine.

A "Usage Based Lifing Cost Model," illustrated at 64, evaluates the input data 52 and the operational parameters of the aircraft 10 to determine how much of a component's life, or alternatively, the amount of wear or damage expected to occur to a component during operation of the aircraft 10. In one embodiment, the Usage Based Lifing Cost Model 64 is configured to use data gathered by a Health and Usage Monitoring System (HUMS) and/or an Integrated Vehicle Health Monitoring System (IVHMS) to provide fault detection capability, determine a current state of life of a component, and gather historical data about the amount of damage that occurred to a component during previous flights and certain operational parameters. With reference to FIGS. 5a-5c, examples of various graphs comparing load and damage of certain components to airspeed and other operational parameters that may be embedded within the Usage Based Lifing Cost Model 64 are illustrated. Other parameters may be used in performing an expected damage calculation, such as air temperature, attitude, angular rates, mass flows, and linear accelerations, for example.

With reference to FIG. 5B, it is noted that the current industry standard establishes component retirement time for many components based off of flight hours flown based off of a conservative mission profile. As a result of this determination, it is beneficial for the operator of an aircraft 10 to fly fast in order to minimize the component cost per flight hour flown. However, since actual component damage increases with maneuver severity, as shown in the graph of FIG. 5A, the current component replacement standard encourages operators to fly in a manner which may actually shorten the life of a component.

Additionally, with reference to FIG. 5A, it is seen that fatigue damage occurs on a component when maneuver severity increases the component load above an endurance limit. As such, when a damage accrual rate is implemented as a user constraint as discussed herein, the aircraft maneuver severity may be restricted for the purpose of delaying component replacement and thus reducing maintenance and/or replacement costs. For instance, as certain components on an aircraft 10 wear at various rates for various flight conditions and maneuvers, damage accrual rates may be defined as a user constraint to limit maneuver severity such that the timing of component maintenance and replacement may be synchronized.

Alternately, as a particular component approaches the end of its life, an operational restriction may be implemented to contain the component load below the endurance limit such that the component does not accrue any more damage until the operator decides that it is convenient to replace the component. This information may be communicated from the optimization algorithm to the pilot via a limit bug on the flight displays. In another embodiment, this information is communicated from the optimization algorithm to the flight control computer where it is automatically implemented as a variable limit. Note that this approach allows tuning the aircraft operational envelope which may allow for infinite life (i.e. on-condition replacement) for parts which require retirement based upon current methods.

In conventional systems, envelope protection limits used to prevent structural damage to the aircraft and caution a pilot from exceeding certain parameters, such as maximum airspeed for example, are stored as fixed algorithmns, maps, or numbers and are not adjustable by an operator. In addition, existing systems intended to improve the economic operation of the aircraft dictate to a flight condition to reduce damage. The optimization algorithm, however, allows an operator to provide one or more operational limits which may or may not represent the least damaging or most economic point of operation for the aircraft. These operator-configurable limits provide a visual cue to the operator which may assist the operator in maximizing profit of the aircraft within the constraints of the operator's environment.

With reference to FIG. 5C, a notional graph shows that engine damage rate increases with power. Since flying fast requires more power, there may be an engine damage cost associated with cruising at high speed which could negate some potential benefits of cruising at high speed. Additionally, if excessive power is demanded during takeoff, then the engine incurs damage at a higher rate. As such, the optimization algorithm 50 considers options for maximizing profit by adjusting takeoff maneuvers to reduce these power excursions. Examples of adjustments in takeoff maneuvers include defining more benign takeoff maneuvers, and commanding supplemental power systems to provide power to the drivetrain during takeoff for example, to balance the cost of such profile modifications and supplemental power system engagement with the cost of the damage incurred on the engine had these adjustments not been made.

In another embodiment, the expected damage calculation can also include the factoring of sensor data such as vibration data measured from an accelerometer, for example. Aircraft operation that causes a higher than nominal amount of vibration can reduce component life and increase unscheduled maintenance, thus the calculation of anticipated damage can indicate this to the aircraft operator. In addition, other considerations may be evaluated by the Usage Based Lifing Cost Model 64, such as start and stop cycles of components that contribute to the wear and ultimate replacement of certain components i.e. a rotor system, engine, and APU for example.

In one embodiment, the optimization algorithm 50 additionally considers one or more constraints 66 associated with the flight strategy or mission plan provided as a primary input to the algorithm, or with general operation of the aircraft. The constraint data 66 accessible by the processor may be stored within a memory or may be input by an operator of the aircraft. The constraint data 66 defines at least one parameter within which the aircraft 10 must operate. Examples of constraint data 66 include, but are not limited to geographical limitations, such as areas where the aircraft cannot fly for example, minimum requirements associated with the performance of the aircraft, envelope limits, such as pressure density and altitude limits for example, noise limitations, company specific operational recommendations, and Notices to Airmen (NOTAMs). Note that implementing each of these constraints (as well as user defined constraints) has the potential to limit the economic efficiency of the operation of the aircraft. As a result, the operator may be able to provide an input to the flight control system and the optimization algorithm whether or not to abide by the constraint. In one embodiment, the optimization algorithm calculates the cost incurred by adhering to these limitations and provides that information to the user.

Each of the plurality of various cost models 54 associated with the optimization algorithm 50 evaluates the input data 52 and one or more parameters related to operation of an aircraft 10 in view of the constraint data 66. As a result, each of the cost models 54 generates an output having different units. For example, although the operational cost model 58 may be configured to assign a dollar amount to the costs associated with operation of the aircraft 10, the cost of the environmental impact of operating the aircraft 10, such as nitrous oxide emissions or noise pollution for example, may have different units. Similarly, the evaluation performed using the Usage Based Lifing Cost Model 64 will result in another unit, such as total percent damage or % of reduced life of a component for example.

To properly compare each of the values generated by the various cost models 54, the optimization algorithm 50 includes a weight matrix 68 configured to prioritize the importance of the various cost models and other information input into the algorithm 50. The weight matrix 68 is configured to convert the outputs from each of the plurality of cost models 54 into a homogeneous unit, thereby allowing the optimization algorithm 50 to appropriately weigh and compare the information from the cost models 54, the constraint data 66, and the any other information input 52 into the algorithm 50. Depending upon the users selected flight strategy, the weighting values included in the weight matrix 68 may vary.

In one embodiment, such as when the input 52 includes a selected flight strategy and sensor data, the optimization algorithm 50 is configured to generate a flight plan having a plurality of optimized parameters associated therewith to maximize the profit of the operation of the aircraft 10. In another embodiment, such as when the input 52 includes a proposed mission plan, the optimization algorithm 50 may be configured to output a plurality of various mission strategies, each having one or more distinct operating parameters, and a cost and/or revenue associated with each strategy. Further, during operation of the aircraft 10, the optimization algorithm 50 may be able to update, in real time, such as based on information provided by the aircraft sensors and related to one or more variable parameters of the mission, such as wind for example. One or more changes in operation of the aircraft to maximize profit of the mission are then communicated to the autopilot, pilot or operator of the aircraft for improved operation thereof. Although the optimization algorithm 50 is illustrated and described herein with reference to an aircraft, it should be understood that the algorithm may be adopted by any type of transportation vehicle, such as trucks and ships for example.

By evaluating a flight plan, in view of constraints and known relationships between cost, life, and other operating parameters, flight plans and proposed missions can be optimized to not only minimize cost, but also maximize profit.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A system for a vehicle, comprising:
   a receiver configured to receive input data;
   a processor configured to run an optimization algorithm to evaluate the input data, the optimization algorithm including a plurality of cost models configured to determine vehicle operational parameters to meet the input data, wherein the optimization algorithm further includes a weight matrix configured to assign a priority to each value generated by the plurality of cost models; and
   an output device for indicating the vehicle operational parameters that optimize operation of the vehicle in view of the input data.

2. The system according to claim 1, wherein the input data includes at least one of a selected flight strategy, aircraft sensor data, user constraints, and a proposed mission plan.

3. The system according to claim 2, wherein the vehicle operational parameters include a flight plan having a plurality of optimized parameters associated therewith.

4. The system according to claim 2, wherein the vehicle operational parameters include a plurality of various mission strategies, each having one or more distinct operating parameters, and a cost or revenue associated with each strategy.

5. The system according to claim 1, wherein the at least one cost model includes a usage based lifting cost model configured to evaluate damage to one or more components of the vehicle during operation.

6. The system according to claim 1, wherein the at least one cost model includes an environmental cost model configured to evaluate at least one of pollution and emissions generated during operation of the vehicle.

7. The system according to claim 1, wherein the at least one cost model includes an financial cost and revenue model configured to evaluate a cost of operating the vehicle in view of a primary mode of operation of the vehicle.

8. The system according to claim 1, wherein the at least one cost model includes an operator cost model configured to evaluate the cost to an operator based on the data input to the optimization algorithm.

9. The system according to claim 1, wherein the weight matrix is configured to convert each value output from the plurality of cost models into a homogenous unit.

10. The system according to claim 1, wherein the one or more operational parameters are output by the optimization algorithm in real time.

11. The system according to claim 1, wherein the operational parameters output to the vehicle are configured to optimize a profit of the vehicle during operation.

12. The system according to claim 1, wherein the vehicle is an aircraft.

13. A method of optimizing economic operation of a vehicle, comprising:
providing a receiver for receiving input data;
supplying the input data to a usage optimization algorithm;
processing the input data in the optimization algorithm, the optimization algorithm including a plurality of cost models configured to determine vehicle operational parameters to meet the input data, wherein processing the input data further comprises assigning a priority to each value generated by the plurality of cost models; and
outputting to the vehicle at least one vehicle operational parameter such that operation of the vehicle is optimized in view of the input data.

14. The method according to claim 13, wherein the input data is provided to the receiver by one or more sensors of the vehicle.

15. The method according to claim 13, wherein the operational parameters output to the vehicle are configured to optimize a profit of the vehicle during operation.

16. The method according to claim 13, further comprising, changing at least one operational parameter of the vehicle in response to the output from the optimization algorithm.

17. The method according to claim 16, wherein when the vehicle is in autopilot, the optimization algorithm is configured to automatically provide at least one adjustable control reference to the vehicle such that a control system of the vehicle is coupled up to an optimal parameter.

18. The method according to claim 13, wherein the input data includes an operational restriction configured to restrict the accrual of additional damage to a component, the operational restriction being displayed to an operator of the vehicle.

19. The method according to claim 13, wherein the input data includes user constraints and the optimization algorithm associates a cost with each of user constraint.

* * * * *